April 12, 1949. H. D. GIFFEN ET AL 2,466,804
TELEMETRIC SYSTEM
Filed Aug. 14, 1944 2 Sheets-Sheet 1
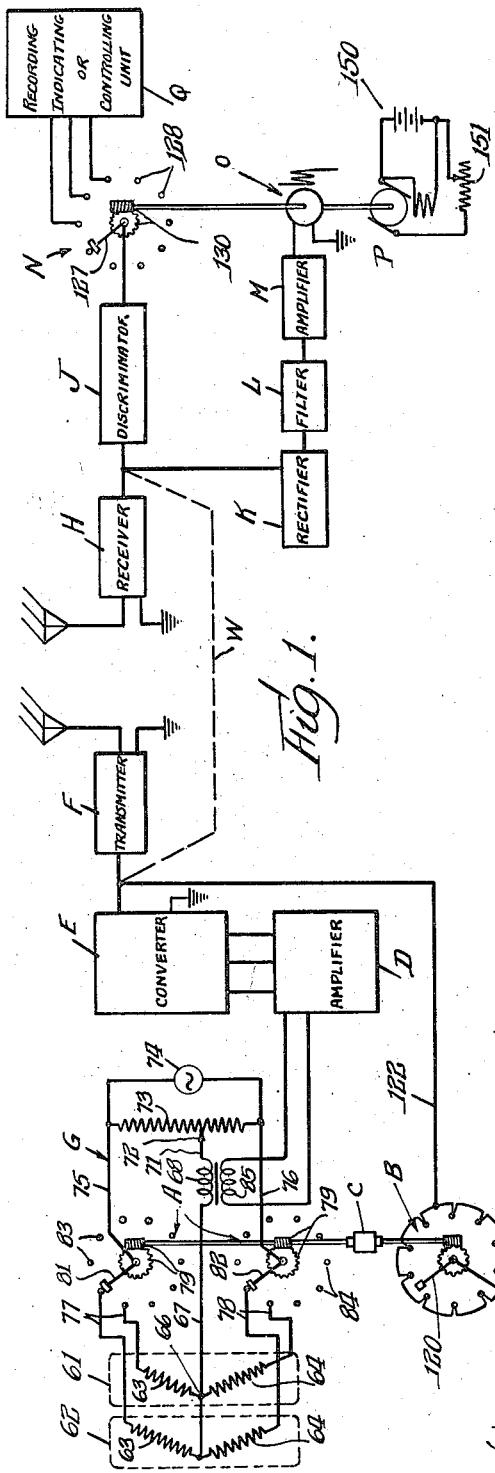
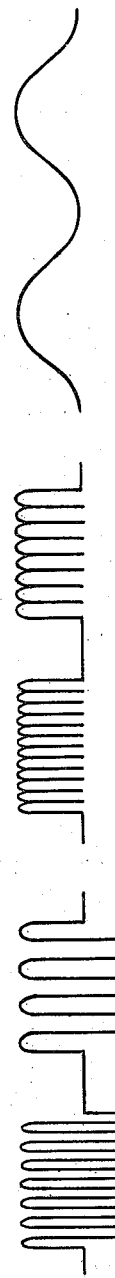
INVENTORS.
Harvey D. Giffen
and Thomas B. Thomson Jr.
By: Fred L. Gerlach atty.

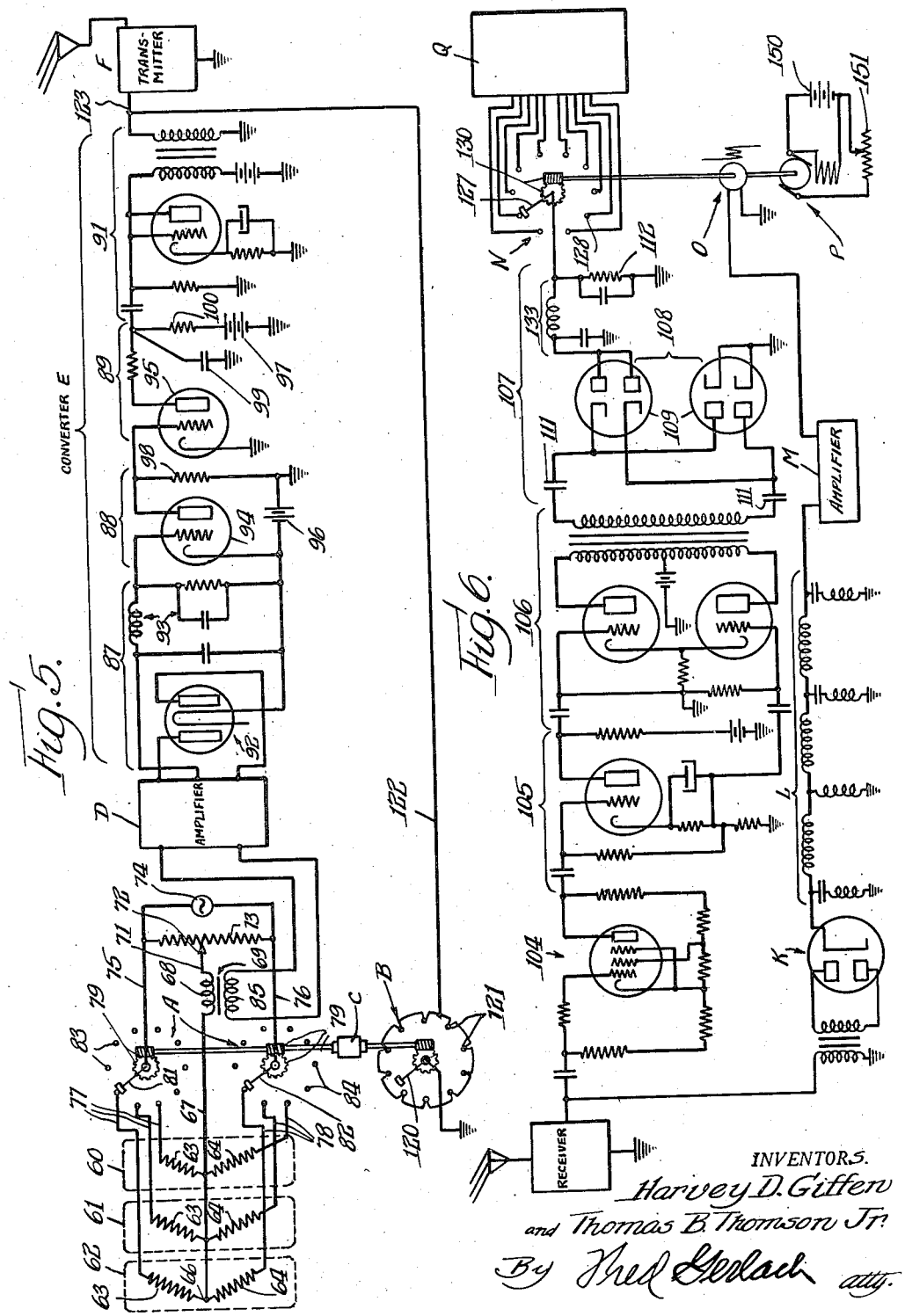

Patented Apr. 12, 1949

2,466,804

UNITED STATES PATENT OFFICE 2,466,804

TELEMETRIC SYSTEM

Harvey D. Giffen, Theodore, Ala., and Thomas B. Thomson, Jr., San Diego, Calif., assignors to Consolidated Vultee Aircraft Corporation, San Diego, Calif., a corporation of Delaware Application August 14, 1944, Serial No. 549,443

7 Claims. (Cl. 177—351)

This invention relates in general to the transmission of intelligence from a remote point, and, more particularly, to an apparatus for effecting the synchronization of an element at the source of the intelligence with an element at the destination of the transmitted intelligence thereby to maintain the system in synchronism.

In a preferred form of the invention the intelligence being transmitted is the changes occurring in detector gauge devices, the gauge devices being associated with the appliance (as, for example, an aeroplane) being investigated and being adapted to be affected by changes occurring in the condition or status of the appliance. The gauge devices may be of a variety of types and capable of detecting changes in temperature, pressure, velocity, stress, etc., dependent on the type of investigation being conducted and the kind of information desired. According to this form of invention the changes in a plurality of gauge devices are transmitted in rapid and recurring sequence by frequency modulation of a carrier wave and over a single channel to a remote point where the various changes may be noted simultaneously with their occurrence. In the operation of the invention it is preferable that a plurality of indicating or recording elements for receiving the transmitted signals in like rapid and repeated sequence be in synchronism with the means at the transmitting station in order that a proper and correct interpretation or use may be had of the transmitted intelligence.

An object of the present invention is to provide a novel apparatus of effecting the synchronization of two remotely located mechanisms.

Another object of the present invention is to provide a novel apparatus for producing a synchronizing signal in a modulated carrier wave.

Another object of the present invention is to provide in a system wherein a series of varying frequency signals are transmitted over the same channel, and in rapid repeated sequence, a novel means for using the envelopes of these signals to produce a constantly recurring signal for effecting synchronization of mechanisms involved.

Another object of the present invention is to provide in a system wherein changes in a plurality of detector gauges are transmitted over a single channel as consecutive signals, means for periodically interrupting these signals to effect the synchronizing of remotely located apparatus.

Another object of the present invention is to provide in a system wherein changes in a plurality of detector gauges are transmitted to a remote point as a series of signals in repeated rotation, means for periodically interrupting this series of signals to produce a synchronizing signal whose frequency is directly related to the number of interruptions effected.

Other objects and advantages will become readily apparent from the following detailed description taken in connection with the accompanying drawings wherein:

Fig. 1 is a diagrammatic representation of a preferred form of the invention.

Figs. 2, 3 and 4 illustrate wave forms in different portions of the receiving means.

Fig. 5 shows in more detail the circuit of the transmitting means; and

Fig. 6 shows in more detail the circuit of the receiving means.

The invention, in the exemplary form chosen for purposes of disclosure, comprises a means for transmitting variable frequency signals, a means for receiving and utilizing these signals, and means for maintaining elements of the transmitting and receiving means in synchronism.

The transmitting means, as illustrated in Figs. 1 and 5, and in its essentials, embodies a plurality of gauge devices 60, 61, 62, a scanning switch A, an interrupting switch B, a driving motor C, an amplifier D, a converting unit E and a transmitter F. The gauge devices are utilized with the transmitting system and feed signals or impulses thereto. When on an aeroplane, the gauge devices are located at various stations thereon so as to be individually actuated by changes in condition of the parts or accessories with which they are associated. The gauges used are preferably of the type that can be connected into an alternating current Wheatstone bridge G as two arms thereof and changes occurring at the stations where the gauges are located will produce an off balance in the Wheatstone bridge to provide a frequency modulated A. C. bridge carrier which is changed in the converter to a varying frequency which, in turn, is fed into the transmitter to modulate the transmitted carrier wave. Switch B has the same number of contacts as switch A and has its contacts displaced angularly midway between the contacts of A. Thus, by having the arms of switches A and B rotate in unison, the arm of switch B makes contact in between each contact made by switch A.

The receiving means comprises a receiver H, a discriminator J, a rectifier K, a filter L, an amplifier M, a scanning switch N, a synchronous motor O, a power motor P and apparatus Q which may be of a recording, indicating or a controlling type, depending upon how the signals produced by the detector gauges are to be utilized. Preferably, the apparatus Q embodies a plurality of actuable elements, one corresponding to and operable in accordance with changes in each gauge device. The discriminator J is understood to embody, along with a discriminator unit, a group of associated elements, such as a limiter, phase inverter and a power amplifier, and will be described in greater detail hereinafter.

The scanning switch N may be of the same general form as one part of scanning switch A, and includes a rotating switch arm and a like number of contacts. It is the purpose of this invention to synchronize the operation of switch N with that of switch A so that the signals received at the apparatus Q are in proper correlation with the signals sent out from the various detector gauges.

The frequency signal as received by receiver H is of the form shown in Fig. 2 and is sent from the receiver E into two channels, one channel leading through the discriminator J and the switch N to the apparatus Q, and the other channel leading through the units K, L and M to the synchronous motor O.

The frequency signal of the form shown in Fig. 2 is first passed through the rectifier K and the signal assumes the form shown in Fig. 3. It is then passed through the tuned filter L and emerges in the form shown in Fig. 4. The frequency of the signal shown in Fig. 4 is dependent upon the number of interruptions effected in the signals from the converter to the transmitter by the interrupting switch B. The converter E is adapted to be constantly emitting a signal, the frequency of which is determined as will be hereinafter described. If there were 10 contacts embodied in switches A and B and the switch arms are revolved at such a speed as to touch all of these contacts once each second, and the arm of switch B is driven at the same speed as the arm of switch A, switch B will make a contact each time that the switch arm of switch A leaves one contact to move to the adjacent contact and thus switch B will act to interrupt the frequency signals being sent out of the converter 10 times each second. The units K and L convert this interrupted signal and effect a new signal of the frequency of the interruptions. The units K and L are not concerned with the value of the frequency signals received but take the interrupted signals and utilize the envelopes thereof to produce the alternating current shown in Fig. 4. This A. C., after amplification, is then fed to the synchronous motor O to thereby effect the synchronization of switch N with switch A. The motor P is used to furnish auxiliary power to operate switch N and so that the synchronous motor O need not be of as large a size as it would have to be if motor P were lacking.

As illustrated in Figs. 1 and 5, the detector gauge devices are shown as embodying two resistance arms 63 and 64 which will effect two arms of the Wheatstone bridge circuit G and which are joined at a common point 66. The common points of the various gauges are connected together and a lead 67 connects them to one end of the primary coil 68 of a coupling transformer 69. A second lead 71 joins the opposite end of the coil 68 to a movable contact 72 of a potentiometer 73, the two ends of which form the other two arms of the Wheatstone bridge G. An alternating current generator 74 is connected across the outer ends of the potentiometer 73.

The gauge devices 60, 61 and 62 (as well as others, not shown) are adapted to be connected, one at a time, and in rapid and repeated succession as arms in the bridge circuit G by means of leads 75 and 76, and leads 77 and 78, and the switch mechanism A. This switch mechanism, as illustrated herein, comprises a pair of rotating switch arms 81 and 82, the outer ends of which pass over and engage, successively, two sets of contacts 83 and 84, one set being arranged annularly about the axis of rotation of each of the switch arms. The leads 77 extending from one end of each gauge device are connected to contacts 83 and the leads 78 extending from the opposite end of the gauge devices are connected to the second set of contacts 84. By rotating the switch arms 81 and 82 in synchronism the gauges are connected individually and in predetermined sequence into the A. C. bridge circuit G.

The motor C effects the rotation of the switch arms 81 and 82 at a constant rate through worm gearing 79 so that each gauge device is connected into the bridge circuit with predetermined frequency. The number of switch contacts embodied in each of the contact sets 83 and 84 can be varied in accordance with the number of gauges it is desired shall be used. With the switch mechanism A shown herein, ten gauge devices can be employed. The invention is not limited to a switch of the type shown or to a mechanical switch for it is obvious that the switch may assume a variety of forms, either mechanical, electrical or electronic.

A coil 85 forms the secondary for the coupling transformer 69 and is adapted to carry the A. C. bridge carrier current from the generator, as modulated by the successive gauges, to an amplifier. The modulated A. C. signal, after amplification, is then passed through the converter E. The circuit of this converter may be subdivided, as shown in Fig. 5, into the several sections 87, 88, 89 and 91 to segregate the various elements thereof for ease of description. Section 87 includes a conventional rectifier 92, which may be a 6ZY5 rectifier tube, and which rectifies the amplified signal. Associated with the rectifier 92 is a filter 93, of conventional design, and which acts to eliminate ripples that may occur. The direct current variable voltage signal passed by filter 93 is fed to the portion of the circuit comprising sections 88 and 89. It is here that the variable voltage signals provided by the various gauge devices are converted into related frequencies. This conversion portion of the circuit comprises two electron tubes 94 and 95; the first tube 94, shown in section 88, is of the 6SK7 type and the second tube 95, in section 89, is a gas triode tube of the 884 type. Tube 94 acts as a phase reverser and corrects for non-linearity in the 884 tube. A battery 96 provides the power for tube 94, the 6SK7, and a battery 97 provides the power for tube 95. A resistance 98 associated with tube 94 develops a voltage of the dimension of the voltage of the signal and which is applied to the grid of tube 95. Tube 95 is an oscillator tube. This tube is associated with a resistance 100 and a condenser 99 to effect a variable oscillator. Condenser 99 and resistance 100 will determine the fundamental range of the frequency generated by tube 95, and in this case it is assumed to be between 1000 cycles and 4000 cycles. If the range is desired changed, another condenser and resistance will be substituted for condenser 99 and resistance 100 and of appropriate values to obtain the range desired.

The changes in amplitude effected by the various gauge devices will thus be fed into the conversion portion of the circuit and will act to cause the oscillator, embodying tube 95, resistance 100 and condenser 99, to change its rate of oscillation. The gauges are so constructed that in their condition of maximum unbalance they will cause the oscillator to change its rate of oscillation to 4000 cycles. If there were no change in a gauge device and therefore no signal passed into the converter E there would still be a signal being passed to the transmitter F and this would be the frequency of 1000 cycles generated by the variable oscillator and for the purpose to be described. Thus as a gauge device varies it controls a frequency which varies between 1000 and 4000 cycles in proportion to the magnitude of the stress or stimuli acting upon the gauge device. However, the converter E can be of any type provided it can accept a signal as produced by a detector gauge device and change this signal into a related audio frequency. The audio frequency signal is then fed into section 91 which comprises a conventional amplifier which will build up the frequency received to the proper volume required to operate or modulate the transmitter F. The audio frequency will thus be transmitted by the transmitter to the point where readings are to be recorded.

Before the frequencies are fed to the transmitter they will be interrupted periodically by the interrupting switch B (Figs. 1 and 5) which has an arm 120 connected to ground. Contacts 121 of switch B are connected together and are connected by a lead 122 into the circuit at a point 123 beyond the converter E. The interrupter switch B and the scanning switch A are both driven by the motor C and in mechanical synchronization but with appropriate gearing 79 provided so that arm 120 of switch B will engage a contact 121 just before the switch arms 81 and 82 leave contacts and will remain engaged until these switch arms reach the next contacts 83 and 84. In this manner there will be effected a periodic shorting out of the audio frequency signals leaving the converter E by periodically connecting the point 123 of the circuit to ground through lead 122 and switch B.

As noted above, the converter E embodies an oscillator 89 that operates continuously so that the signal at point 123 will be continuous whether the arms 81 and 82 are on contacts 83 and 84 or not, and whether a gauge device is connected in to the bridge circuit or not. A gauge device can only change the pitch or frequency of the oscillations between 1000 and 4000 cycles. Thus every time arm 120 engages a contact 121 there will be a frequency at point 123 that can be shorted out. The signal reaching the transmitter F, as a consequence of the operation of the interrupter switch B, will assume the form shown in Fig. 2. As shown, this is a continuous signal having abrupt changes of frequency. It is this signal that is sent by the transmitter F.

As shown in Figs. 1 and 6, the receiver H accepts the transmitted signal in the form shown in Fig. 2 and passes it into two channels, one passing through the discriminator J and to the operated elements of Q, and the other channel passing through rectifier K, filter L and amplifier M to synchronous motor O. In the first channel the signal will pass first into a limiter 104 (Fig. 6) of conventional construction, and which serves to make all the incoming signals of equal amplitude. The signals are then passed through a phase inverter 105, of conventional design, and then into a conventional power amplifier 106, which will act to provide more undistorted power. The signal is then passed to a discriminator 107 wherein the frequencies will be reconverted into proportional D. C. voltages. The discriminator 107 embodies a bridge rectifier 108 comprising two electron tubes 109, of the 6H6 type. Two tubes 109 are used because they will produce approximately twice the voltage of a half wave rectifier. A pair of discriminator condensers 111 are associated with the electron tubes 109. Two condensers 111 are used to effect a balance in the rectifier circuit though one may be used if the value of that one were changed proportionately. The frequencies received at the discriminator condensers 111 will have a direct relation to the voltage produced across a resistance 112; that is, changes in the reactance of condensers 111 will effect proportional changes of voltage applied across resistance 112. The voltages across resistance 112 will be directly related to the voltages controlled by the detector gauge devices. A filter 133 of conventional design is provided to eliminate ripples that may occur in the signals.

Thus the changes in amplitude effected by the gauge devices 60, 61 and 62 are converted into proportional frequencies on passage through the conversion unit E and, after transmission, are reconverted, in the discriminator 107, into voltages, proportional to the transmitted frequencies. These voltages are then applied at the switch N. The switch N comprises a rotating arm 127 and a plurality of contacts 128 adapted to be successively engaged by arm 127 to feed the signals to an apparatus Q which may be of a recording, indicating or a controlling type, depending on whether the signals produced by the detector gauges are desired to be recorded, or are to be used to operate an indicating instrument or are to control the operation of any designated mechanism. If the signals are to be recorded, an apparatus such as that disclosed in our copending application Ser. No. 549,441, filed August 14, 1944, may be used. The invention, it is pointed out, is not to be limited to the employment of a switch N having a rotating arm 127 but may employ a switch of any construction which is operable for performing the desired function.

It is the purpose of this invention to provide means for synchronizing the movements of arm 127 of switch N with the arms 81 and 82 of switch A so that the signals received at apparatus Q are properly correlated with the signals sent out by the various detector gauge devices. This is accomplished by the interrupting switch B and by the rectifier K and filter L, as will now be described.

As stated above, the received signals are passed into two channels. In the first channel the signals are fed through a discriminator 107, as has been described. In the second channel the signals are fed through the rectifier K and filter L. The signals (in the form shown in Fig. 2) will pass first through the rectifier K and will then assume the form shown in Fig. 3. They then pass through the tuned filter L to emerge in the form shown in Fig. 4. The frequency of the signal shown in Fig. 4 is dependent upon the speed of the interrupting switch B. If arms 81 and 82 of switch A are revolved at such a speed as to touch each of their 10 contacts once each second, arm 120 of switch B (whose movement is synchronized with the movements of arms 81 and 82) engages a contact 121 each time arms 81 and 82 move from one contact to the next, and interrupts the signals leaving converter E, ten times each second. The rectifier-filter means K, L receiving the frequency signals from receiver H, will thus provide a new signal of the frequency of the interruptions, as shown in Fig. 4. The rectifier-filter means K, L is not concerned with the value of the frequency signals received but takes the interrupted signals and utilizes only the envelopes thereof.

The synchronous motor O effects the movement of the switch arm 127 through suitable gearing 130. The signal current of Fig. 4 will be fed to this motor O, after being passed through the amplifier M to bring it up to an effective value, and the motor O will then operate the switch N in synchronism with switch A.

To furnish some of the power for driving the switch N the motor P may be connected in tandem with the synchronous motor O, as illustrated in the drawings. Preferably, the motor P is of a variable speed type, the one herein illustrated being arranged to be operated on a direct current source of power indicated by battery 150 in a circuit embodying a rheostat 151. In this way the speed of the motor P can be adjusted so that it carries the desired portion of the load of driving the switch N, the synchronous motor O then serving principally as a means for controlling the speed of operation of the switch N and keeping it in step with the switch A.

In the use of the word "telemetering" it is to be understood that our invention is not to be limited to systems utilizing a radio transmitter and receiver but that the invention also may be applied to systems wherein the transmitter F and receiver H are omitted and there is a direct wire connection between the source of intelligence and the circuit of the recording means Q as shown by the dashed line W in Fig. 1.

It is thought that the invention and its numerous attendant advantages will be fully understood from the foregoing description; and it is obvious that numerous changes may be made in the form, construction and arrangement of the several parts without departing from the spirit or scope of the invention, or sacrificing its attendant advantages, the form herein disclosed being a preferred embodiment for the purpose of demonstrating the invention; and we do not claim herein either the patentable combinations including specific means for controlling the production of high frequency oscillations in the transmitting system or of the transmitting system itself, the same being claimed in a co-pending application Serial No. 535,481, now abandoned; nor the patentable combination embodying particular features of the receiver and recorder mechanism, or the manner of operating the same, as claimed in co-pending application Serial No. 549,440; nor the combination including particular features of the recording apparatus and the operation thereof, the same being claimed in a co-pending application Serial No. 549,441; nor the combination forming a telemetric system including a plurality of sending stations and the means of operating the same, as claimed in a co-pending application Serial No. 549,442; the present invention herein claimed residing in the combinations recited in the appended claims.

We claim as our invention:

1. A telemetric system comprising, in combination, a plurality of gauge devices, a radio frequency transmitter, an oscillator connected to modulate the radio frequency carrier wave, means for varying the frequency of said oscillator between a predetermined audio frequency and a second audio frequency in rapid and repeated sequence and in accordance with changes in said gauge devices including a switch device operating to connect in said gauge devices in such sequence, means operating in regular recurring sequence and in synchronism with said switch device to interrupt the effect of said gauges on said oscillator, means operable in accordance with changes in said gauge devices and having an element corresponding to each gauge device, means including a synchronous motor driven switch device for transferring the modulated oscillations in regular recurring sequence to said elements simultaneously with the connection of said gauge devices, and means for operating said synchronous motor driven switch in step with said switch device of the transmitter comprising rectifying and filtering means for producing an alternating current in step with said interruptions in the oscillator, and means including an amplifier connecting said alternating current producing means to said synchronous motor.

2. A telemetric system comprising, in combination, a plurality of gauge devices, a radio frequency transmitter, an oscillator connected to modulate the radio frequency carrier wave, means for varying the frequency of said oscillator between a predetermined frequency and a second frequency in rapid and repeated sequence and in accordance with changes in said gauge devices including a switch device operating to connect in said gauge devices in such sequence, means operating in regular recurring sequence and in synchronism with said switch device to interrupt the effect of said gauges on said oscillator so that it operates at said predetermined frequency, means including a motor driven switch device for scanning the modulated oscillations in regular recurring sequence simultaneously with the connection of said gauge devices, and means for operating said motor driven switch in step with said first switch device of the transmitter comprising means for producing an alternating current in step with said interruptions in the oscillator.

3. A telemetric system comprising, in combination, a plurality of gauge devices, a radio frequency transmitter, an oscillator connected to modulate the radio frequency carrier wave, means for varying the frequency of said oscillator between a predetermined low frequency and a second frequency in rapid and repeated sequence and in accordance with changes in said gauge devices including a switch device operating to connect in said gauge devices in such sequence, means operating in regular recurring sequence and in synchronism with said motor operated switch device to interrupt the effect of said gauges on said oscillator so that it operates at said predetermined frequency, means including a synchronous motor driven switch device for scanning the modulated oscillations in regular recurring sequence simultaneously with the connection of said gauge devices, and means for operating said synchronous motor driven switch in step with said switch device of the transmitter comprising rectifying and filtering means for producing an alternating current in step with said interruptions in the oscillator, and means including an amplifier connecting said alternating current producing means to said synchronous motor.

4. A telemetric system comprising, in combination, a plurality of gauge devices, a radio frequency transmitter, an oscillator connected to modulate the radio frequency carrier wave, means for varying the frequency of said oscillator between a predetermined frequency and a second frequency in rapid and repeated sequence and in accordance with changes in said gauge devices including a switch device operating to connect in said gauge devices in such sequence, means operating in regular recurring sequence and in synchronism with said switch device for interrupting the effect of said gauges on said oscillator so that it operates at said predetermined frequency, means operable in accordance with changes in said gauge devices and having an element corresponding to each gauge device, means including a synchronous motor driven switch device for transferring the modulated oscillations in regular recurring sequence to said elements simultaneously with the connection of said gauge devices, and means for operating said synchronous motor driven switch in step with said first switch device of the transmitter comprising means for producing an alternating current in step with said interruptions in the oscillator, and means including an amplifier connecting said alternating current producing means to said synchronous motor.

5. A telemetric system comprising, in combination, a plurality of gauge devices, a radio frequency transmitter, an oscillator connected to modulate the radio frequency carrier wave, means for varying the frequency of said oscillator between a predetermined frequency and a second frequency in rapid and repeated sequence and in accordance with changes in said gauge devices, including a switch device operating to connect in said gauge devices in such sequence, means operating in regular recurring sequence and in synchronism with said switch device for superimposing a synchronizing signal on the frequency modulated carrier wave, means operable in accordance with changes in said gauge devices and having an element corresponding to each gauge device, means including a motor driven switch device for transferring the modulated oscillations in regular recurring sequence to said elements simultaneously with the connection of said gauge devices, and means for operating said motor driven switch in step with said first switch device of the transmitter comprising means for producing an alternating current in step with said synchronizing signal.

6. A telemetric system comprising in combination, a radio frequency transmitter, an oscillator connected to modulate the radio frequency carrier wave, frequency varying means for varying the frequency of said oscillator between a predetermined frequency and a second frequency in rapid and repeated sequence, including a switch device operating to connect said frequency varying means with said oscillator in such sequence, means for superimposing a synchronizing frequency upon the modulated carrier wave in synchronism with said switch device, a plurality of operable means operable at a carrier wave receiving station in response to said frequency modulations of the carrier wave, a motor driven switch at said receiving station for transferring the frequency modulations to said operable means, in regular recurring sequence, and means for operating said motor driven switch in synchronism with the switch device comprising means for producing an alternating current in step with said synchronizing signal, and applying said alternating current to regulate the speed of said motor driven switch.

7. A telemetric system comprising in combination, a radio frequency transmitter, modulating means to modulate the radio frequency carrier wave, means for varying the modulating frequency of said modulating means to various predetermined frequencies in rapid and repeated sequence, including a switch device operating to connect said frequency varying means with said modulating means in such sequence, means for superimposing a synchronizing frequency upon the modulated carrier wave in synchronism with said switch device, a plurality of operable devices operable at a carrier wave receiving station in response to said frequency modulations of the carrier wave, a motor driven switch at said receiving station for transferring the frequency modulations to said operable devices, in regular recurring sequence, and means for operating said motor driven switch in step with the switch device comprising means for producing an alternating current in step with said synchronizing signal, and for applying said alternating current to control the speed of said motor driven switch.

HARVEY D. GIFFEN.
THOMAS B. THOMSON, Jr.

REFERENCES CITED

The following references are of record in the file of this patent:

UNITED STATES PATENTS

| Number | Name | Date |
|---|---|---|
| 463,852 | Bradley | Nov. 24, 1891 |
| 1,505,158 | Martin | Aug. 19, 1924 |
| 1,576,195 | Junken | Mar. 9, 1926 |
| 1,714,967 | Wensley | May 28, 1929 |
| 1,849,827 | FitzGerald | Mar. 15, 1932 |
| 1,965,393 | Schleicher | July 3, 1934 |
| 2,039,405 | Green et al. | May 5, 1936 |
| 2,225,657 | Potts | Dec. 24, 1940 |
| 2,256,482 | Isbister et al. | Sept. 23, 1941 |
| 2,321,971 | Becker | June 15, 1943 |
| 2,378,395 | Dickson | June 19, 1945 |

FOREIGN PATENTS

| Number | Country | Date |
|---|---|---|
| 275,594 | Great Britain | Apr. 15, 1928 |

OTHER REFERENCES

Pages 317–353 in book entitled "Television Engineering" by J. C. Wilson, published in London in 1937 by Sir Isaac Pitman & Sons, Ltd.